(12) United States Patent
Brown (10) Patent No.: US 10,645,907 B2
(45) Date of Patent: May 12, 2020

(54) RETRACTABLE ANIMAL LEASH

(71) Applicant: Techsynergy Limited, Kent (GB)

(72) Inventor: Leslie F. Brown, Kent (GB)

(73) Assignee: Techsynergy Limited, Kent (GB)

( * ) Notice: Subject to any disclaimer, the term of this patent is extended or adjusted under 35 U.S.C. 154(b) by 82 days.

(21) Appl. No.: 15/736,286

(22) PCT Filed: Jun. 10, 2016

(86) PCT No.: PCT/GB2016/051725
§ 371 (c)(1),
(2) Date: Dec. 13, 2017

(87) PCT Pub. No.: WO2016/203206
PCT Pub. Date: Dec. 22, 2016

(65) Prior Publication Data
US 2018/0206454 A1    Jul. 26, 2018

(30) Foreign Application Priority Data

Jun. 15, 2015 (GB) .................................. 1510421.9

(51) Int. Cl.
*A01K 27/00* (2006.01)
*B65H 75/44* (2006.01)

(52) U.S. Cl.
CPC ....... *A01K 27/004* (2013.01); *B65H 75/4428* (2013.01); *B65H 75/4431* (2013.01); *B65H 75/4492* (2013.01); *B65H 2701/35* (2013.01)

(58) Field of Classification Search
CPC .............. A01K 27/004; B65H 2701/35; B65H 75/4492; B65H 75/4428
See application file for complete search history.

(56) References Cited

U.S. PATENT DOCUMENTS

| | | | |
|---|---|---|---|
| 10,051,841 B2* | 8/2018 | O'Brien | A01K 27/004 |
| 2005/0217610 A1 | 10/2005 | Thompson et al. | |
| 2006/0266300 A1 | 11/2006 | Perkitny | |
| 2012/0073516 A1* | 3/2012 | Ek | A01K 27/004 |
| | | | 119/796 |
| 2012/0234959 A1* | 9/2012 | Christianson | B65H 75/4431 |
| | | | 242/396.1 |

(Continued)

FOREIGN PATENT DOCUMENTS

| | | |
|---|---|---|
| EP | 2594130 | 5/2013 |
| GB | 2461876 | 1/2010 |

OTHER PUBLICATIONS

Techsynergy Limited, "International Search Report and Written Opinion", PCT/GB2016/051725, dated Aug. 4, 2016.

(Continued)

*Primary Examiner* — Trinh T Nguyen (74) *Attorney, Agent, or Firm* — Womble Bond Dickinson (US) LLP (57) ABSTRACT

A retractable leash device has a first handle for holding the device, a spool and a leash wound on the spool. There is a spring-based rewind mechanism for the leash. A second handle is provided for manually retracting the leash. A mechanical coupling between the second handle and the spool provides a second rewind mechanism for the leash. This second rewind mechanism is used to pull an animal back toward the owner in a safe and convenient way.

13 Claims, 12 Drawing Sheets

(56) References Cited

U.S. PATENT DOCUMENTS

| | | | |
|---|---|---|---|
| 2014/0033992 A1* | 2/2014 | Reed | A01K 27/001 119/792 |
| 2015/0075449 A1* | 3/2015 | O'Brien | A01K 27/004 119/797 |
| 2016/0120152 A1* | 5/2016 | Zhu | A01K 27/004 119/796 |
| 2016/0143253 A1* | 5/2016 | Pawlowski | A01K 27/004 119/796 |
| 2017/0000089 A1* | 1/2017 | Woods | A01K 27/004 |
| 2018/0027775 A1* | 2/2018 | Smith | A01K 27/004 |

OTHER PUBLICATIONS

Techsynergy Limited, "Search Report", GB Application No. 1510421.9, dated Dec. 7, 2015.

* cited by examiner

RETRACTABLE ANIMAL LEASH

FIELD OF THE INVENTION

This invention relates to the field of retractable animal leash devices.

BACKGROUND TO THE INVENTION

Retractable animal leash devices are well known. Typically, the device comprises a spool on which the leash is wound. The leash may be unwound by the animal by pulling on the leash, and rewound by the action of a spring when the pulling force exerted by the dog is less than that of the spring. Thus, the spring keeps the leash taught in use.

Retractable animal leash devices are popular with dog owners as they allow the dog to roam further than most fixed length leashes. It is usual for the retractable leash to feature a braking mechanism so that extension and retraction of the leash may be prevented. In this way, the leash may be set to a desired short length, for example when walking on a pavement.

A problem arises that there are occasions where the owner will wish to reduce the length of the extended lease, for example, when the owner observes a dangerous situation such as a car or other animal approaching. Retracting the leash manually can only be achieved by reducing the pulling force exerted by the dog such that the rewind spring bias is sufficient to wind in the leash.

There are various ways to do this. One is to approach the dog to reduce the distance between the owner and dog, thereby to reduce tension on the leash. Another is to pull on the dog using the leash (with the brake applied), then rapidly extend the owners pulling arm back towards the dog (with the brake released) such that the leash is momentarily no longer tensioned and may partly rewind. This requires cyclic operation of the brake, with synchronisation of the braking mechanism during the pull and extend cycles. It also becomes difficult or impossible if the dog is continuously pulling.

A final alternative is to override the retractable leash functionality by directly grasping the exposed leash between the handle and the dog. This is dangerous and may result in injury to the owner. Examples of injury are friction burns resulting from slippage of the leash in the hand.

There is therefore a need for an animal leash that can be retracted manually safely and quickly in emergency situations.

SUMMARY OF THE INVENTION

The invention is defined by the claims.

According to examples in accordance with an aspect of the invention, there is provided a retractable leash device, comprising:
 a first handle for holding the device;
 a spool;
 a leash wound on the spool;
 a rewind mechanism for the leash;
 a second handle for manually retracting the leash in the form of a retractable pull handle; and
 a mechanical coupling between the second handle and the spool providing a second rewind mechanism for the leash.

This design provides a manual function for pulling back a dog. It is intuitive and does not need the user to put down the leash or carry out any complicated operations. The user simply has to operate the second handle with their free hand to reel back the dog. The second handle is a pull handle, which enables the user to pull back the dog in an intuitive and automatic way. It is preferably spring loaded so that it retracts itself, and a full retraction of the dog leash preferably corresponds to a plurality of pulls of the pull handle.

The main rewind mechanism for the leash for example comprises a spring that urges the spool to rewind. This is used to rewind the leash after use or to maintain the leash taught in use. It is the conventional rewind mechanism.

The device preferably comprises a control mechanism for the spool, which is operable in:
 a first mode in which the spool is free to rotate in both a wind and unwind direction;
 a second mode in which the spool is only able to rotate in the wind direction; and
 a third mode in which the spool is locked.

Note that in the second mode, there will inevitably be some play in the mechanism so that there is not perfect locking in the unwind direction. However, substantial movement of the leash is only possible in the wind direction.

The first mode is a normal dog walking mode in which the dog is free to roam within the overall range of the leash. The second mode is for use in the manual emergency rewind mode. When reeling the dog back in, for example against its will, this mode prevents the dog regaining distance between successive uses of the second handle. This mode may also be used in a non-emergency situation, and it then allows the dog to come back in its own time, but then to be kept close by.

The third mode is used for setting a particular leash length, for example when a short leash is needed.

The control mechanism for example comprises a ratchet pawl for engaging with ratchet teeth of the spool. It may be disengaged for the first mode, engaged loosely for the second mode (for example under the bias of a spring) and engaged tightly for the third mode (for example under the bias of a mechanical wedge).

The second handle comprises a pull handle, and the device preferably comprises a second spool and a cord wound on the second spool attached to the second handle.

The pull handle is preferably mounted in a cradle. Removing the second handle from the cradle may then set the control mechanism to the second mode. In this way, the user does not actively need to make any mode selection in order to use the second handle.

The first and second spools may be spring biased towards each other, and a rotation lock is provided, which allows rotation between the first and second spools in only one relative rotational direction. Ratchet surfaces can be used for this purpose which ride over each other in one direction, but which lock in the other direction. This allows the second spool to be used repeatedly to progressively manually rewind the first spool.

A retaining mechanism may be provided having a normal mode in which the first and second spools are kept separated when the second handle is not being used. This normal mode means the second spool does not interfere with the normal operation of the leash device. Only in the emergency mode does the second spool play any role at all.

A user control device may be provided for setting the retaining mechanism to the normal mode, wherein the control device is released when the second handle is engaged by the user, the retaining mechanism then switching to an emergency mode in which the first and second spools engage with each other. This provides automatic spool engagement.

The invention also provides a method of operating a retractable leash device comprising a first handle for holding the device, a spool and a leash wound on the spool, the method comprising:

in normal use holding the leash device by the first handle using a first hand; and in an emergency mode, operating a second handle in the form of a retractable pull handle using a second hand in order to manually retract the leash.

In normal use, the user may select one of three operating modes:

a first mode in which the spool is free to rotate in both a wind and unwind direction;

a second mode in which the spool is only able to rotate in the wind direction; and a third mode in which the spool is locked.

Engaging the second handle preferably automatically sets the device to the second mode so that it is ready for the manual pulling back. The second handle comprises a pull handle, and operating the second handle preferably comprises pulling the second handle a plurality of times, wherein the second handle is automatically rewound between pulls.

BRIEF DESCRIPTION OF THE DRAWINGS

Examples of the invention will now be described in detail with reference to the accompanying drawings in which.

DETAILED DESCRIPTION OF THE EMBODIMENTS

The invention provides a retractable leash device having a first handle for holding the device, a spool and a leash wound on the spool. There is a spring-based rewind mechanism for the leash. A second handle is provided for manually retracting the leash. A mechanical coupling between the second handle and the spool provides a second rewind mechanism for the leash. This second rewind mechanism is used to pull an animal back toward the owner in a safe and convenient way.

Figure 1:
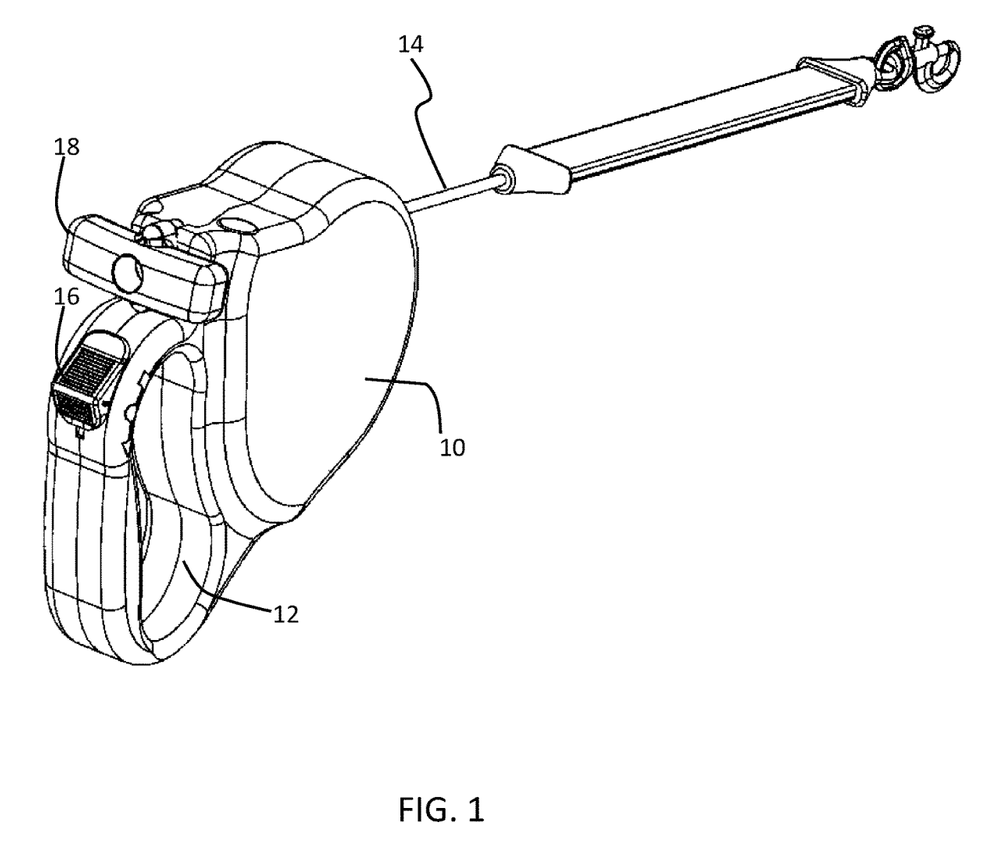
FIG. 1 shows a first view of a retractable animal leash.

FIG. 1 shows a leash device in accordance with an example of the invention.

The device comprises a main body 10 having a first handle 12 which is used to hold the device in normal operation. The leash 14 extends from the main body 10, and it is retractable back into the main body by winding on an internal spool. The spool is spring-loaded, so that the leash 14 can be automatically retracted after use, or during use, if the extended length is to be reduced. The leash has an elastic portion at the end in this example.

There is a control knob 16 for the user. This provides at least two settings. A first is a setting where the leash can be pulled out if there is sufficient force (for example the dog running away) or it will be retracted by the spring bias of the spool if the pulling force is sufficiently low, for example when there is slack in the leash.

To the extent described above, the leash device is conventional.

In accordance with the invention, there is a second handle 18. In the example shown, this is a pull handle, and the user may pull the handle 18 in order to draw the dog back, thereby manually rewinding the leash 14 on its spool. For this purpose, there is a mechanical coupling between the second handle 18 and the spool, thereby providing a second rewind mechanism for the leash.

As shown, the second handle in this example has the form of a toggle. It provides an intuitive and user-friendly way of using the leash, in that the action of pulling back on the second handle 18 translates to pulling back of the dog.

When pulling back on the handle 18, the leash 14 is rewound. Furthermore, at this time, the spool of the leash 14 may only be rewound. Thus, it may take many pulls of the second handle to bring the dog back, but between these pulls, the dog is not able to gain any distance, because the spool is set into a retract mode only. This retract mode is a third setting.

This retract mode may also be set by the user, and then comprises a third position for the knob 16. In this case, the user can decide to let the dog come back in its own time, and as it does, it is prevented from regaining its original distance. This feature is entirely optional. It is enabled because the emergency retraction feature includes the rewind-only capability, so this can also be offered to the user as an additional feature.

Figure 2:
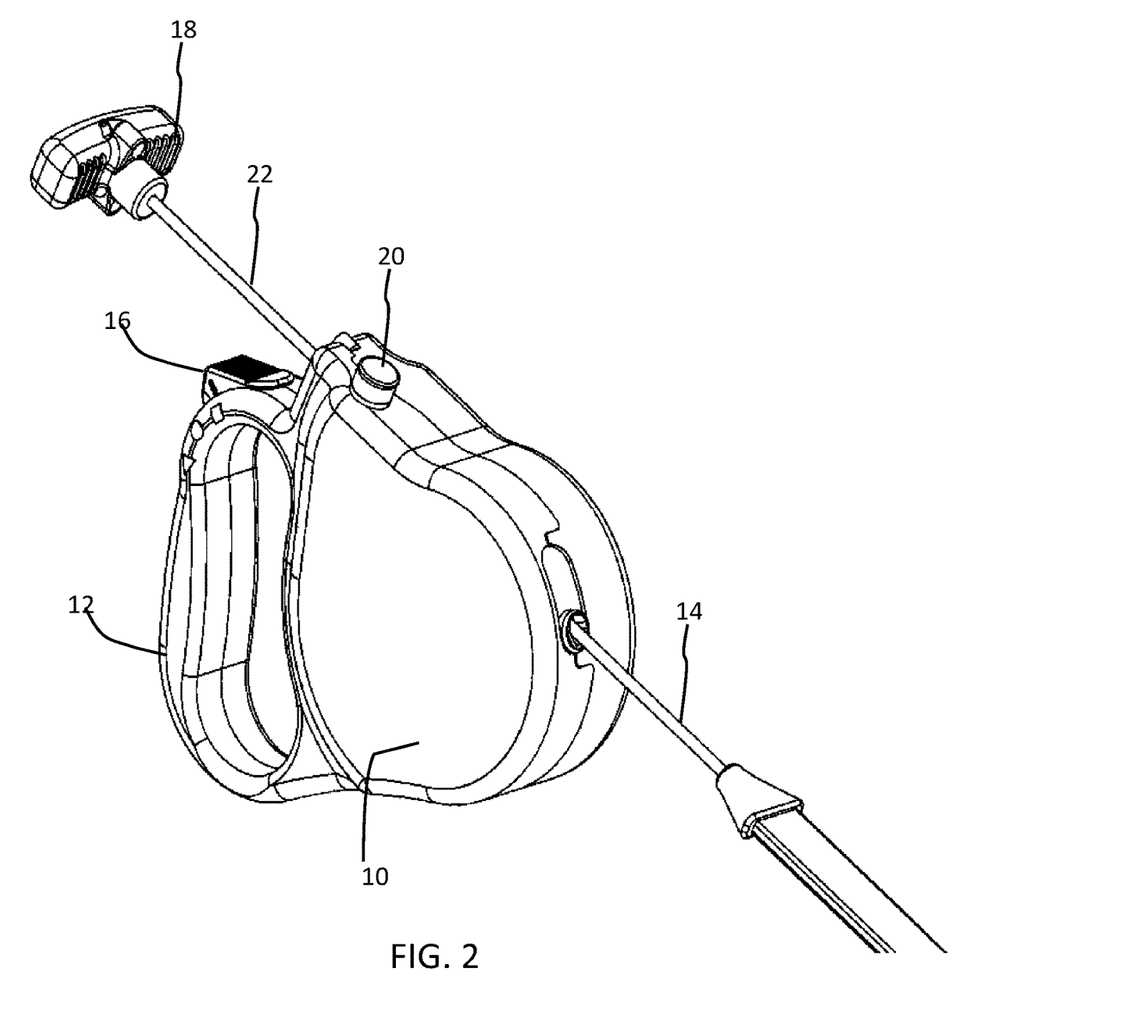
FIG. 2 shows a second view of a retractable animal leash.

FIG. 2 shows the device with the second handle 18 partly extended.

There is a user control device in the form of a pop up button 20 which pops up when the second handle 18 is being used. It may be brightly coloured so the user can see that the device is in the emergency mode (since in this mode the leash cannot be used in normal manner). The device can be set back to the normal mode by resetting the button 20.

The second handle 18 is connected to a cord 22 which is wound on a second spool. The cord and the leash are wound oppositely on their spools. Thus, if the spools rotate together, when the cord 22 is being unwound by pulling on the handle 18, the leash 14 will be wound up.

The second spool needs to be able to wind back up without letting out the leash 14. Thus, there is a single rotational direction link between the two spools. This is a simple ratchet arrangement. When the second spool is being unwound, it drives the first spool with it, but when the second spool is being wound up, it rotates relative to the first spool which remains static.

This coupling between the two spools is not suitable during normal use of the device.

Figure 3:
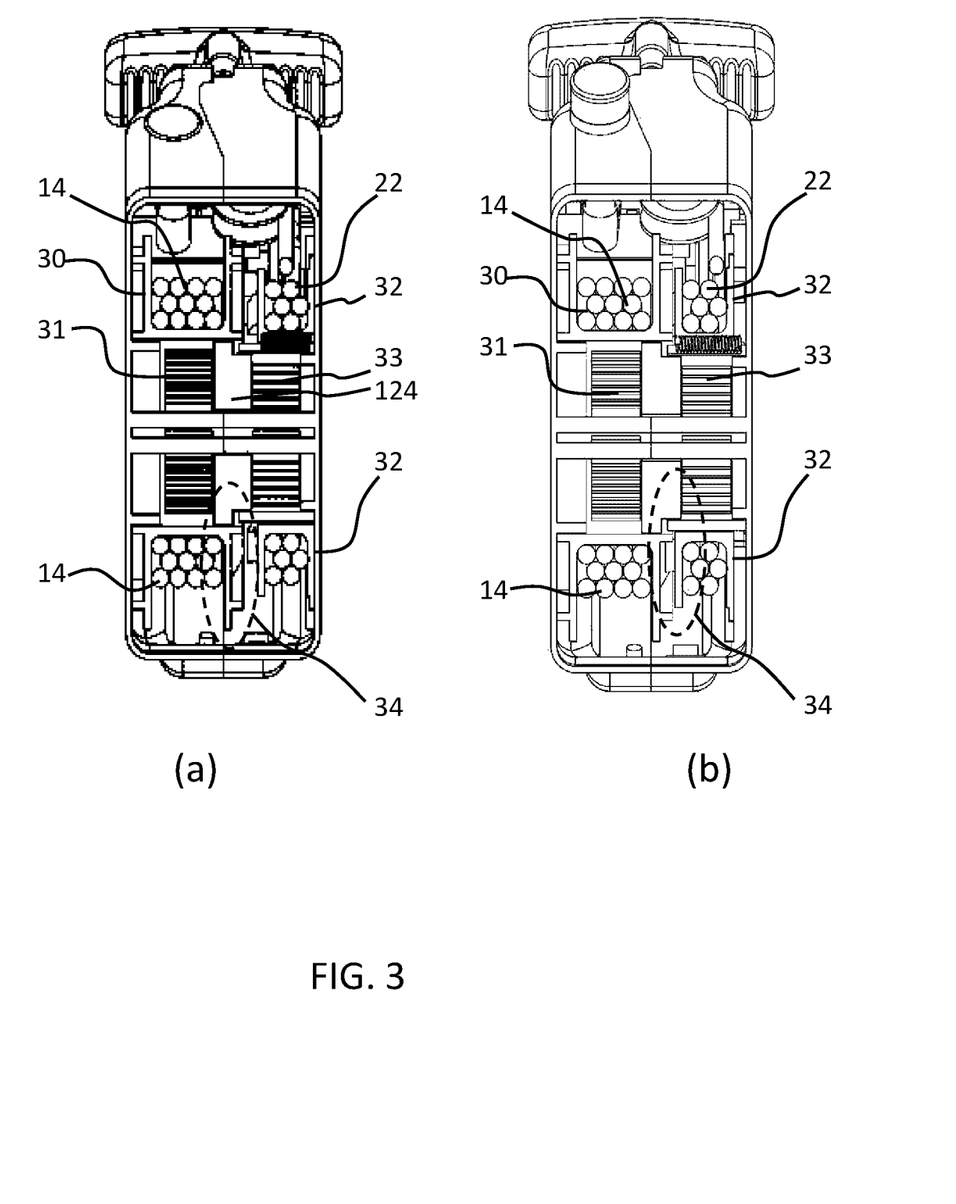
FIG. 3 shows two cross sections to show engagement and disengagement of two spools.

The two spools are thus able to be brought into and out of engagement with each other. This is achieved by moving the second spool axially into and out of engagement with the first spool FIG. 3 shows a cross section through the spools. FIG. 3(a) shows the spools out of engagement with each other and FIG. 3(b) shows the spools in engagement with each other.

The first spool (for the leash 14) is shown as 30 with its central spiral torsion spring 31 and the second spool (for the emergency cord 22) is shown as 32 with its central spring 33. In FIG. 3(a) the axial separation between the spools can be seen at 34, whereas in FIG. 3(b) there is a relative axial shift to result in engagement between the spools which can be seen at 34.

Figure 4:
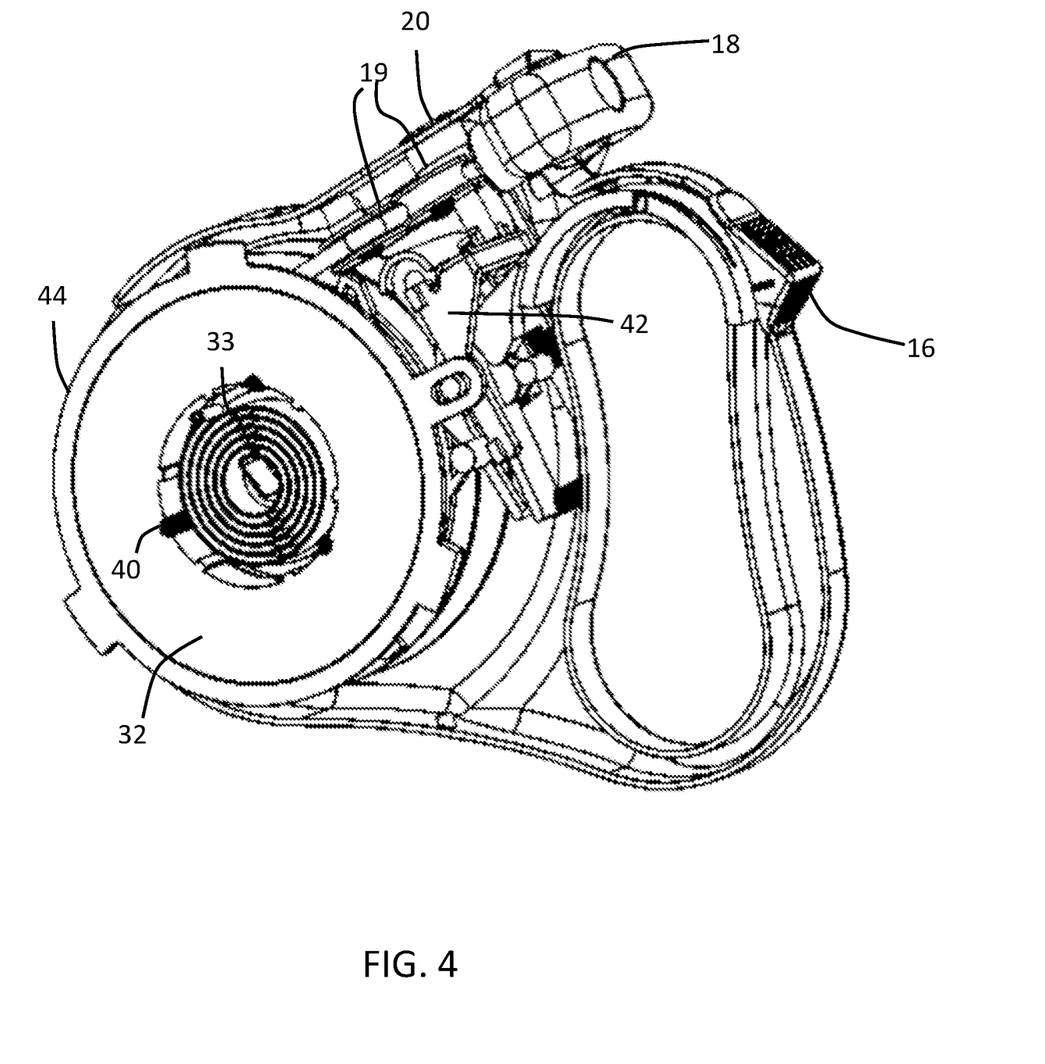
FIG. 4 shows a perspective view with a side casings removed.

FIG. 4 shows the device with a side casing removed from the side having the second spool 32.

The second spool 32 is biased axially towards the first spool by springs 40. However, there is a retaining mechanism preventing this movement (discussed further below). The retaining mechanism is released (so that the spools can engage with each other) when the button 20 is released. This upward movement of the button 20 causes a carrier 42 to move up, and this drives rotation of a spool carrier disc 44. It is this rotation which engages or releases the retaining mechanism.

The cord 22 passes over two pulley wheels 19 before reaching the second spool 32. These simply allow an offset between the second spool and the second handle.

The control knob 16 operates a control mechanism, in the form of a ratchet and pawl arrangement, which will now be described in more detail.

The ratchet and pawl mechanism is operable in:
a first mode in which the spool is free to rotate in both a wind and unwind direction;
a second mode in which the spool is only able to rotate significantly in the wind direction; and
a third mode in which the spool is locked.

Figure 5:
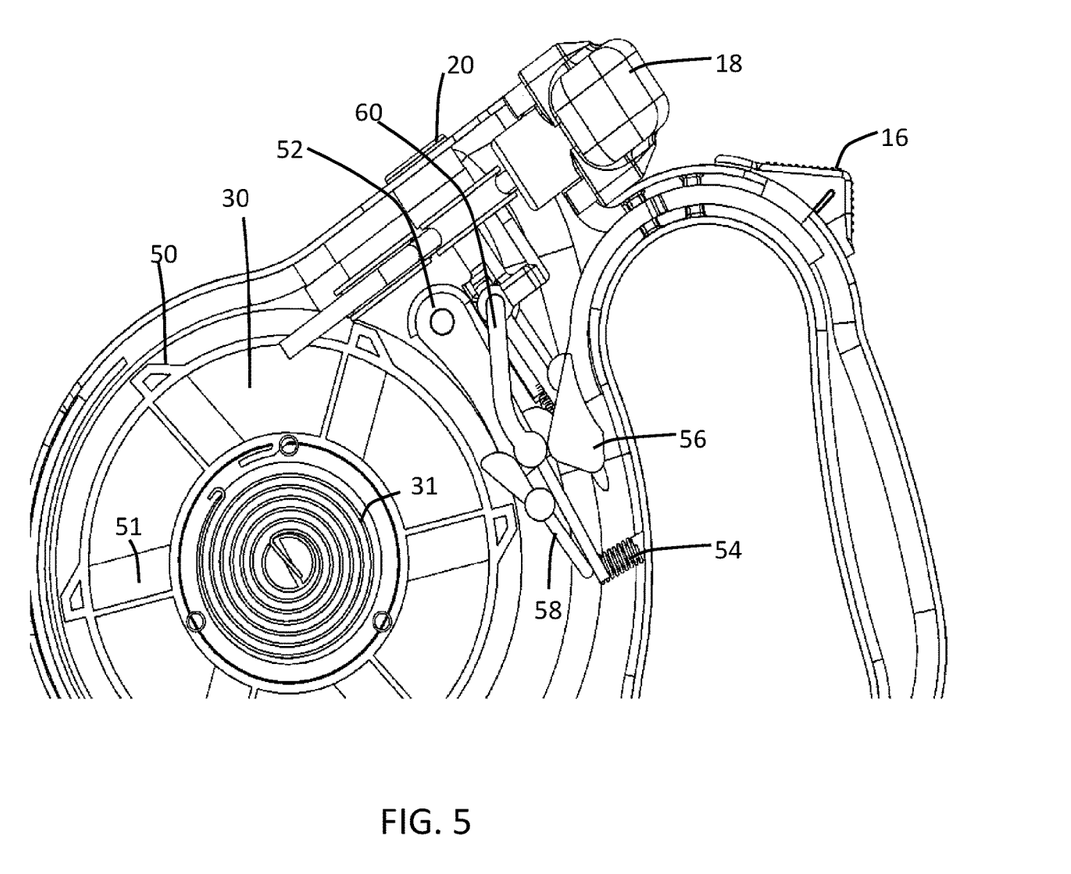
FIG. 5 shows a view of the internal components with the leash in a first operating mode.

The first mode is shown in FIG. 5. The first spool 30 has ratchet teeth 50 near its circumference. A pawl 52 is biased against the ratchet teeth 50 by a pawl spring 54 unless this function is blocked. In FIG. 5, a first projection 56 which is linked to the control knob 16 by an arc shaped coupling is positioned so that it pivots a lever 58 which then pushes the pawl 52 away from the first spool. The spring 54 is then held in a compressed state. There is an intermediate first spacer 60 between the first projection 56 and the lever 58.

The first spool 30 also has ratchet faces 51 on the outer surface, which function as a rotation lock. They engage with corresponding features on the second spool when the two spools are brought together, so that rotation of the second spool in one direction drives the first spool, but rotation of the second spool in the other direction (when the cord 22 is being rewound) causes the spools to ride over each other. When they ride over each other, the springs 40 compress and relax repeatedly. Thus, there is a single direction rotational coupling between the two spools.

Figure 6:
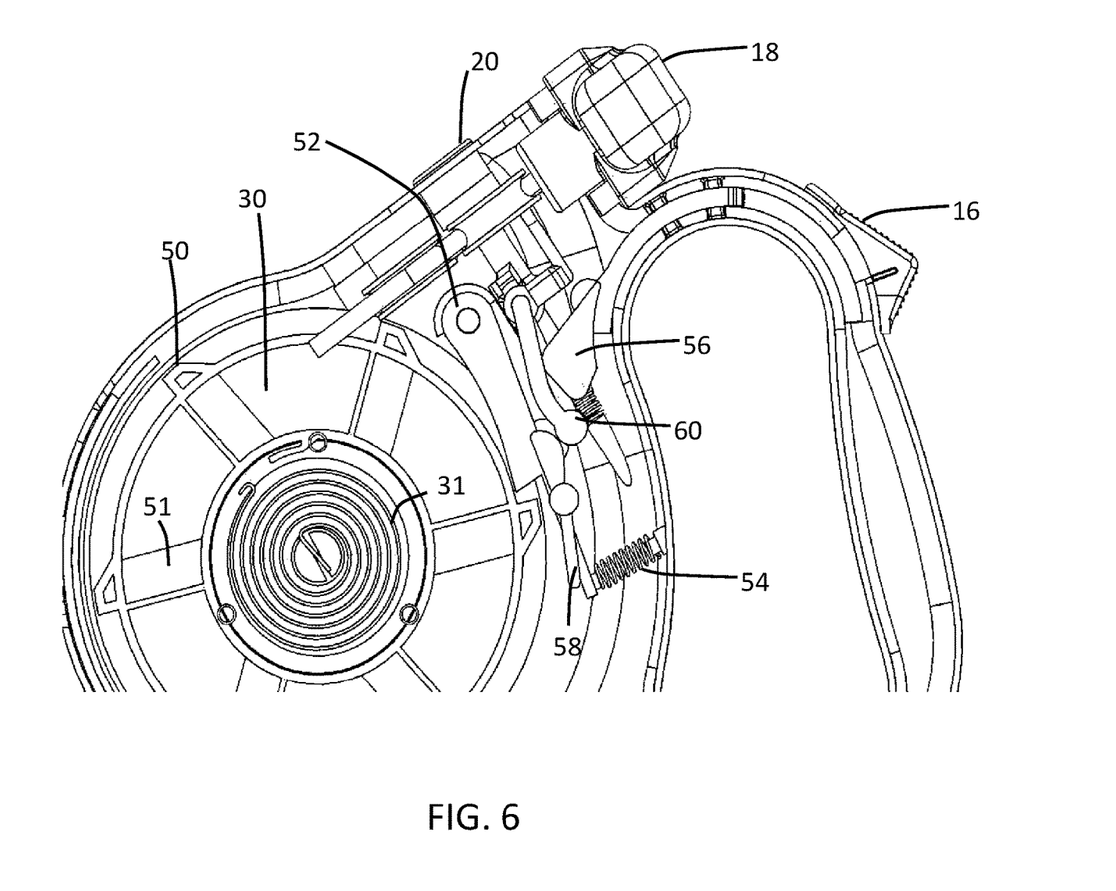
FIG. 6 shows a view of the internal components with the leash in a second operating mode.

The second mode is shown in FIG. 6. The position of the control knob 16 is lower, and the first projection 56 is higher, so there is nothing impeding the spring 54 from pushing the pawl 52 against the first spool 30. The pawl 52 can ride over the teeth 50 only when the leash is being wound up on the first spool 30 and it is rotating clockwise (as viewed when looking at FIG. 6). The pawl rides over the teeth, biased by the spring 54. This is the emergency mode in which the leash can only be wound up and not unwound.

Figure 7:
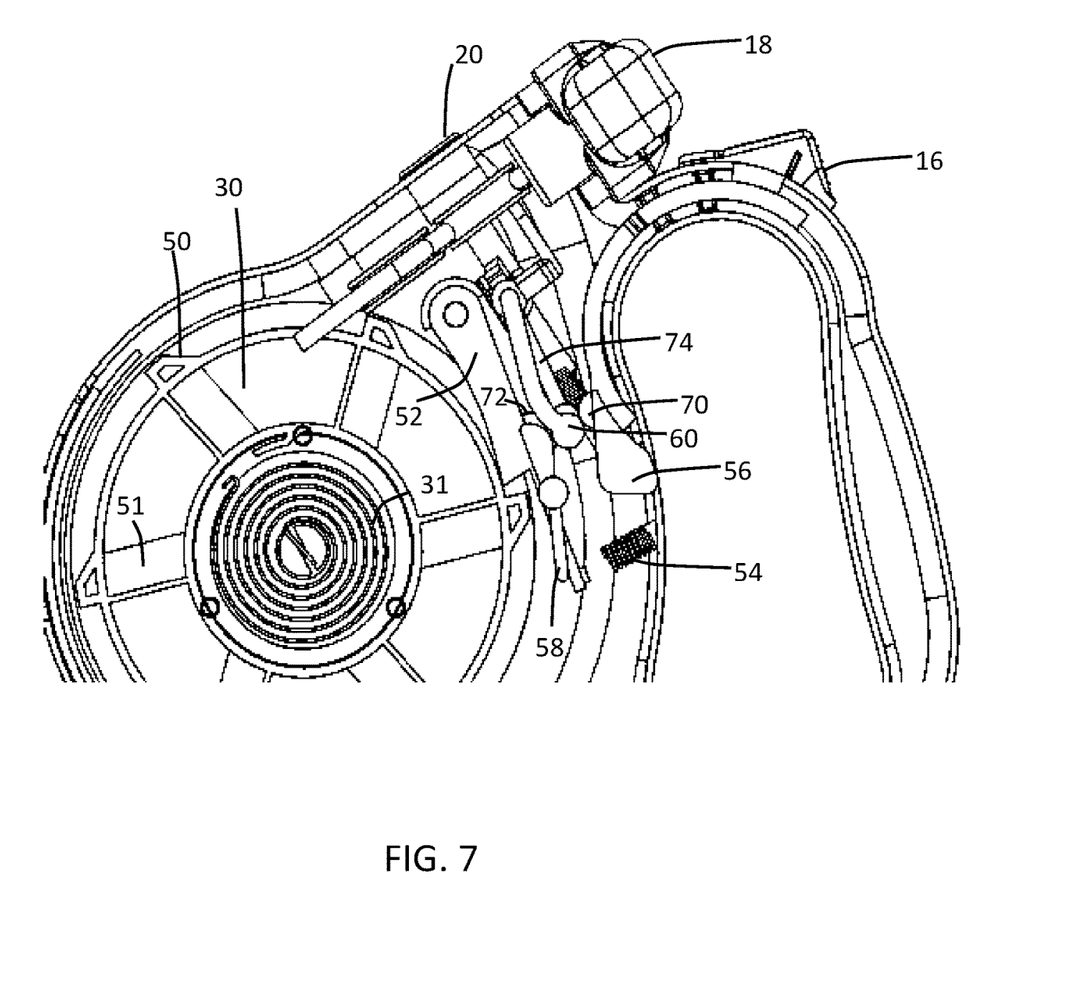
FIG. 7 shows a view of the internal components with the leash in a third operating mode.

The third mode is shown in FIG. 7. The position of the control knob 16 is higher. A second projection 70 which is also linked to the control knob 16 is positioned so that it pushes on a third projection 72 which is directly on the pawl 52. This then pushes the pawl 52 hard against the spool as a brake. There is an intermediate second spacer 74 between the second projection 70 and the third projection 72. Note that the projections 70, 72 and the second spacer 74 are at a different depth in the image compared to the projection 56, first space 60 and lever 58. This will become apparent from the 3D images described below.

Figure 8:
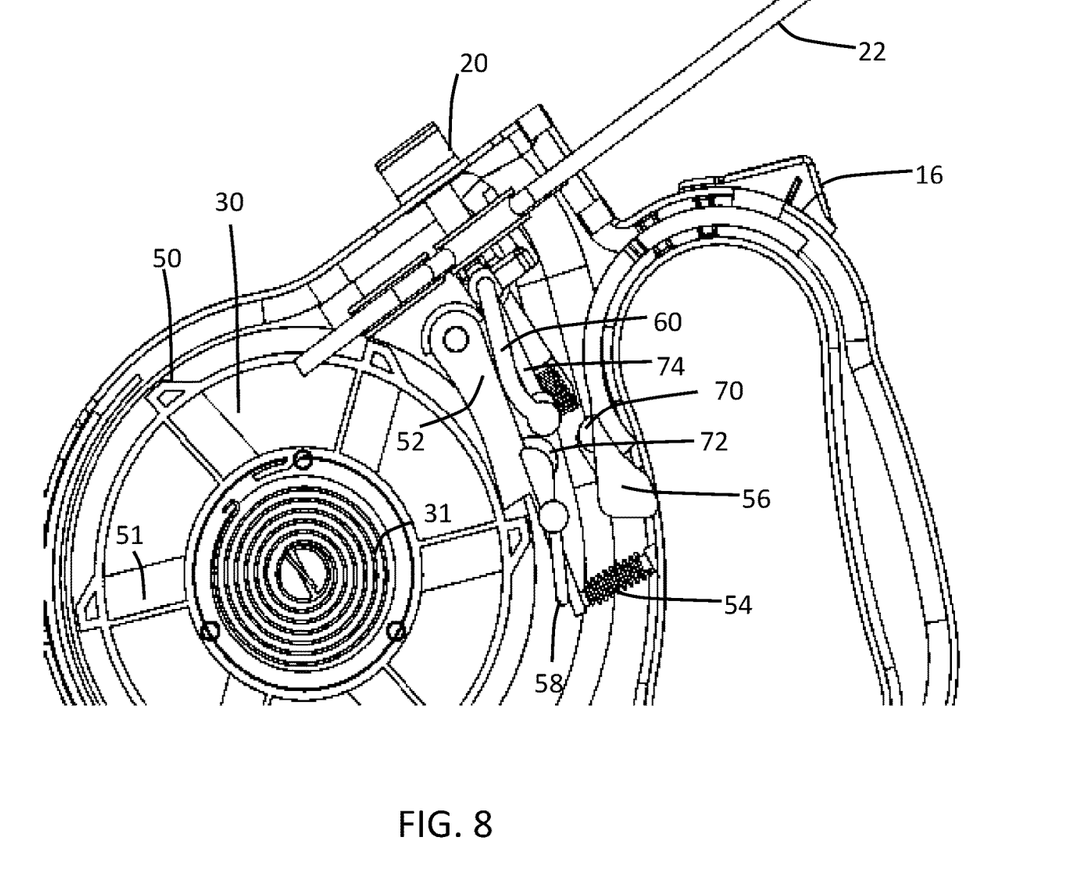
FIG. 8 shows a view of the internal components with the leash in an emergency operating mode.

FIG. 8 shows the emergency mode with the button 20 released. The button carries with it the first and second spacers 60, 74. This means there is no possible blocking function for the pawl 52 because there is always a gap between the projection 56 and lever 58 and between the projections 70 and 72. Thus, the pawl 52 is urged against the spool by the spring 54 and the device is in the second mode of FIG. 6, but with the two spacers in a different position.

Figure 9:
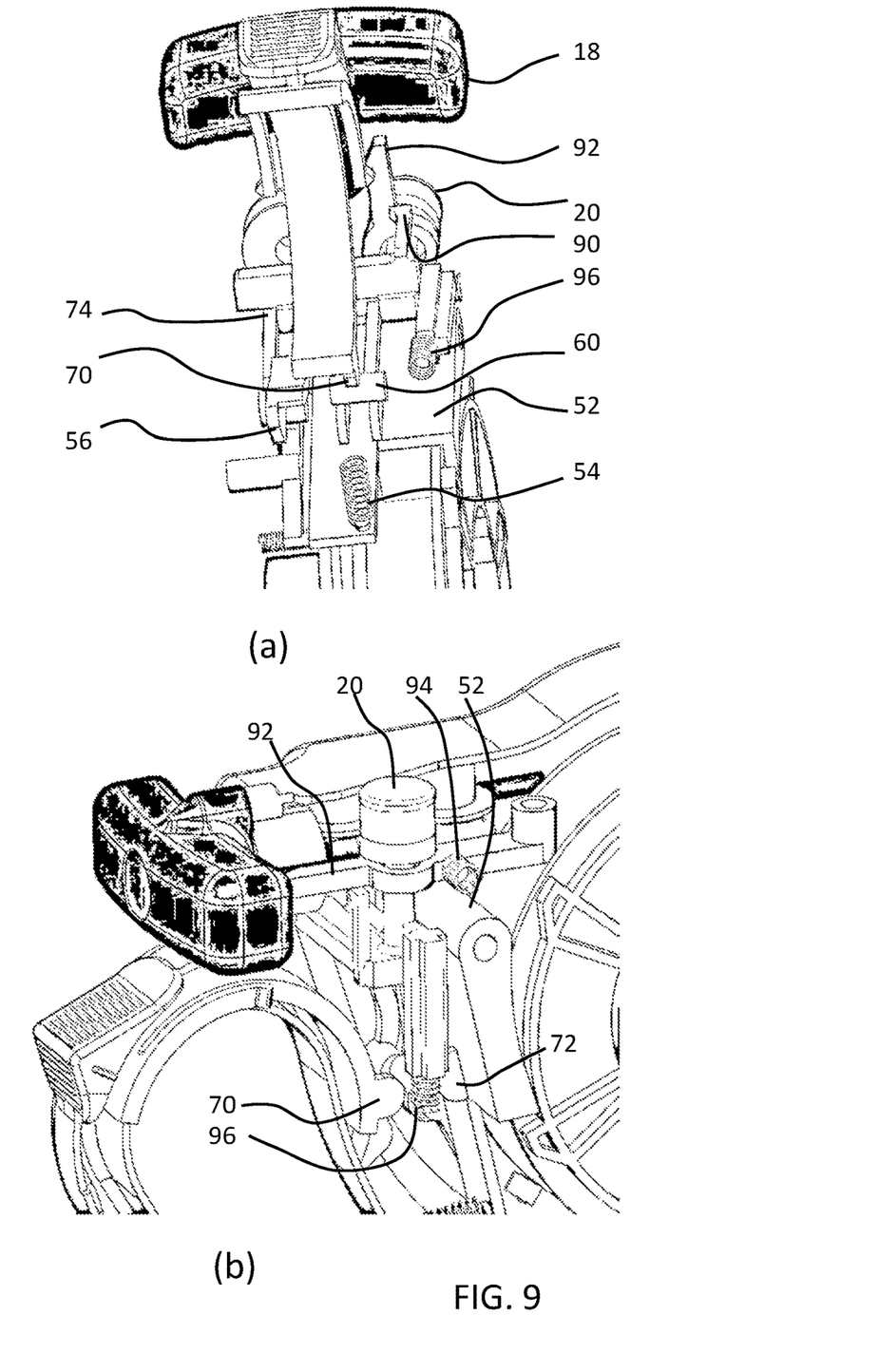
FIG. 9 shows two 3D views of some of the internal components to show the operation of a pop up button.

The button 20 pops up as soon as the second handle 18 is removed from its holster. The way this operates is shown in FIG. 9.

The button 20 has a catch 90 which sits under an arm 92. When the handle is pulled out, the arm 92 moves laterally (to the left in FIG. 9(a)) under the bias of a spring 94. With the handle in place, this movement of the arm is prevented. The catch is then released, and the button pops up under the influence of a spring 96. When the button 20 lifts, it carries with it the two spacers 60,74. The catch 90 has a sloped lower face so that it can be reset simply by pushing the button down. The catch 90 then deforms slightly over the arm 92.

Figure 10:
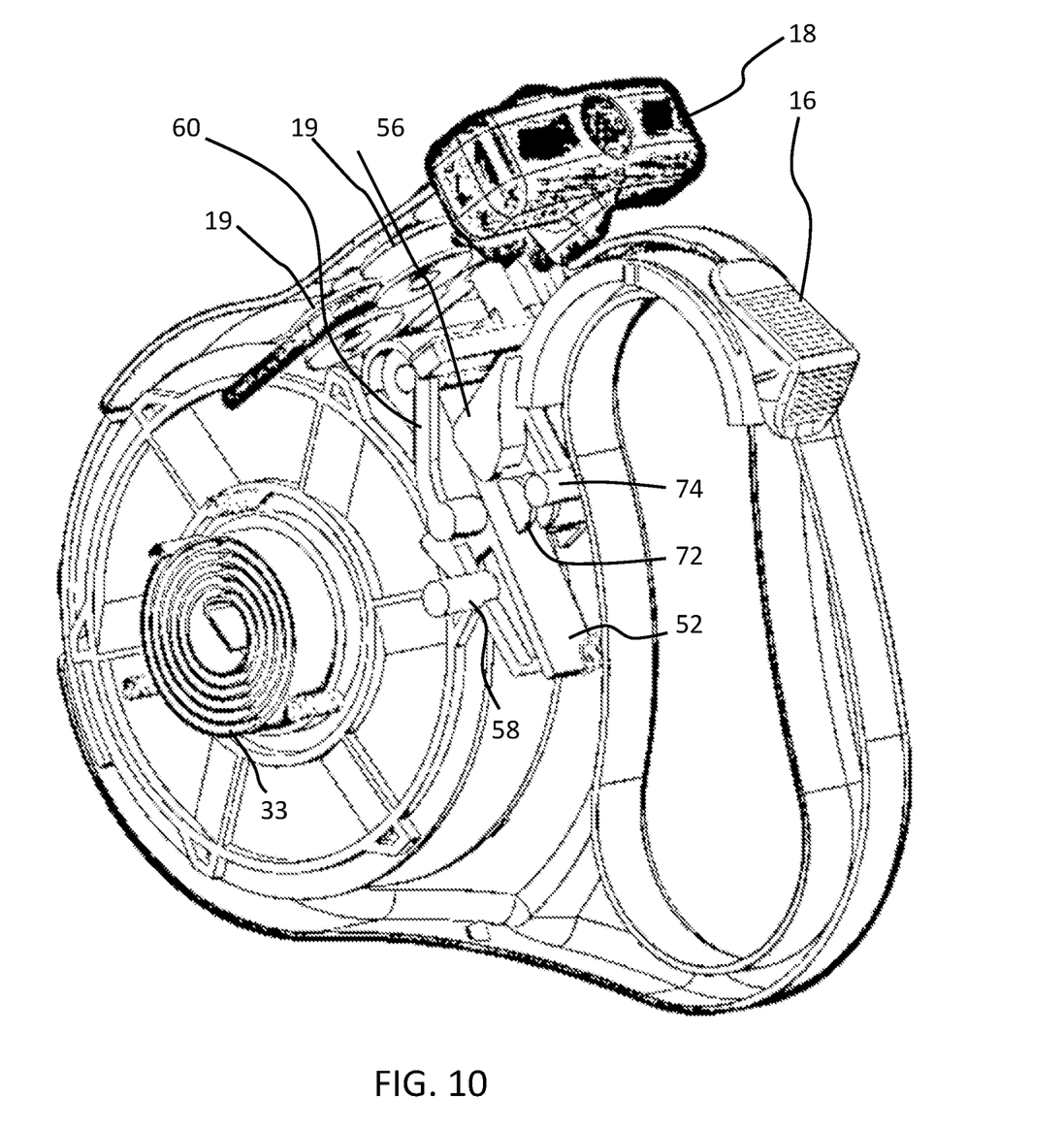
FIG. 10 shows a 3D view of some of the internal components.

FIG. 10 is a perspective view showing some of the components described above. It shows the two spacers 60, 74 more clearly.

As shown in FIG. 4, the button 20 drives rotation of a spool carrier disc 44. This is shown more clearly in FIG. 11.

Figure 11:
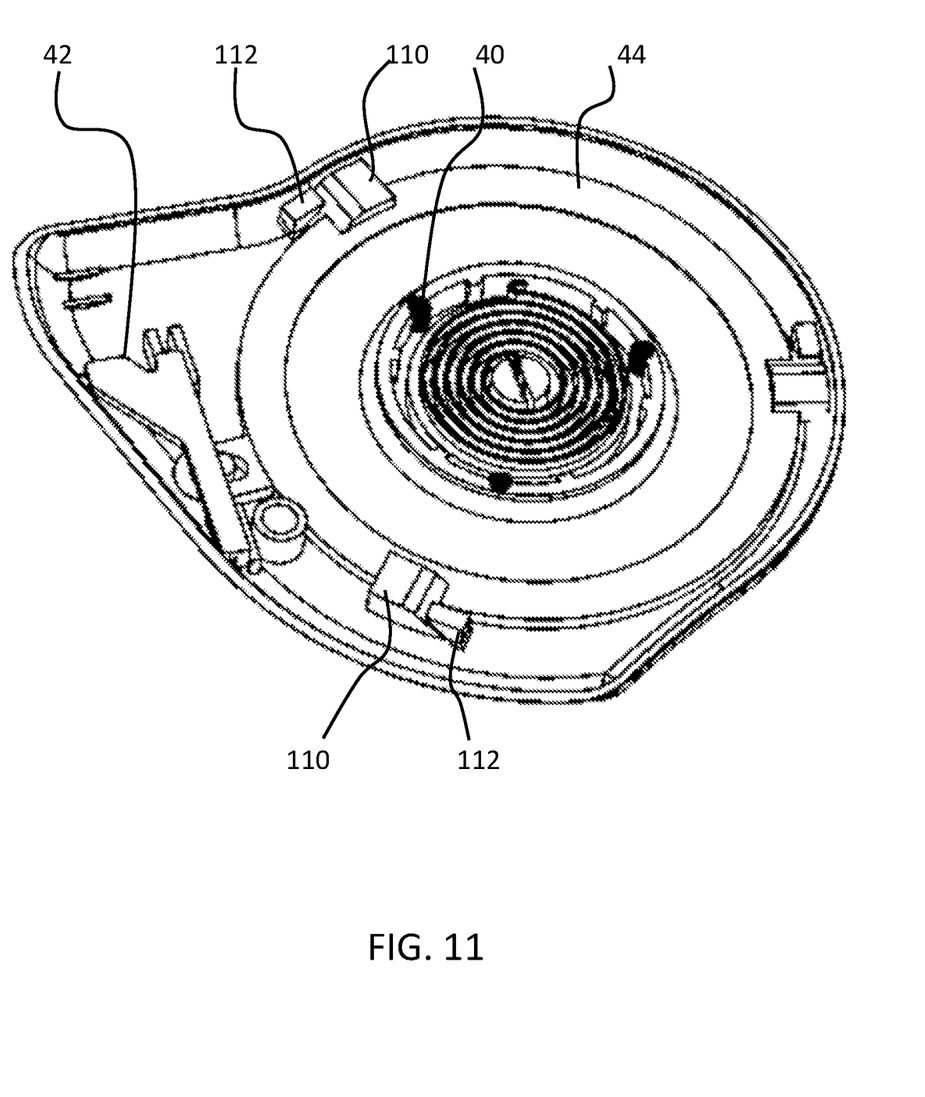
FIG. 11 shows how the second spool is driven into and out of engagement with the first spool.

In one angular position of the disc 44, it functions as a retaining mechanism. The disc has angularly spaced wedges 110 which are trapped under cooperating faces 112. In one angular position, the disc 44 is tightly clamped against the outer housing and the two spools are separated. After rotation, some axial movement is possible and this takes place under the bias of the springs 40. The springs 40 then allow the second spool to move axially back and forth as the two spools ratchet against each other when rotating in one relative direction, whereas they are locked together when rotating in the other relative direction.

Figure 12:
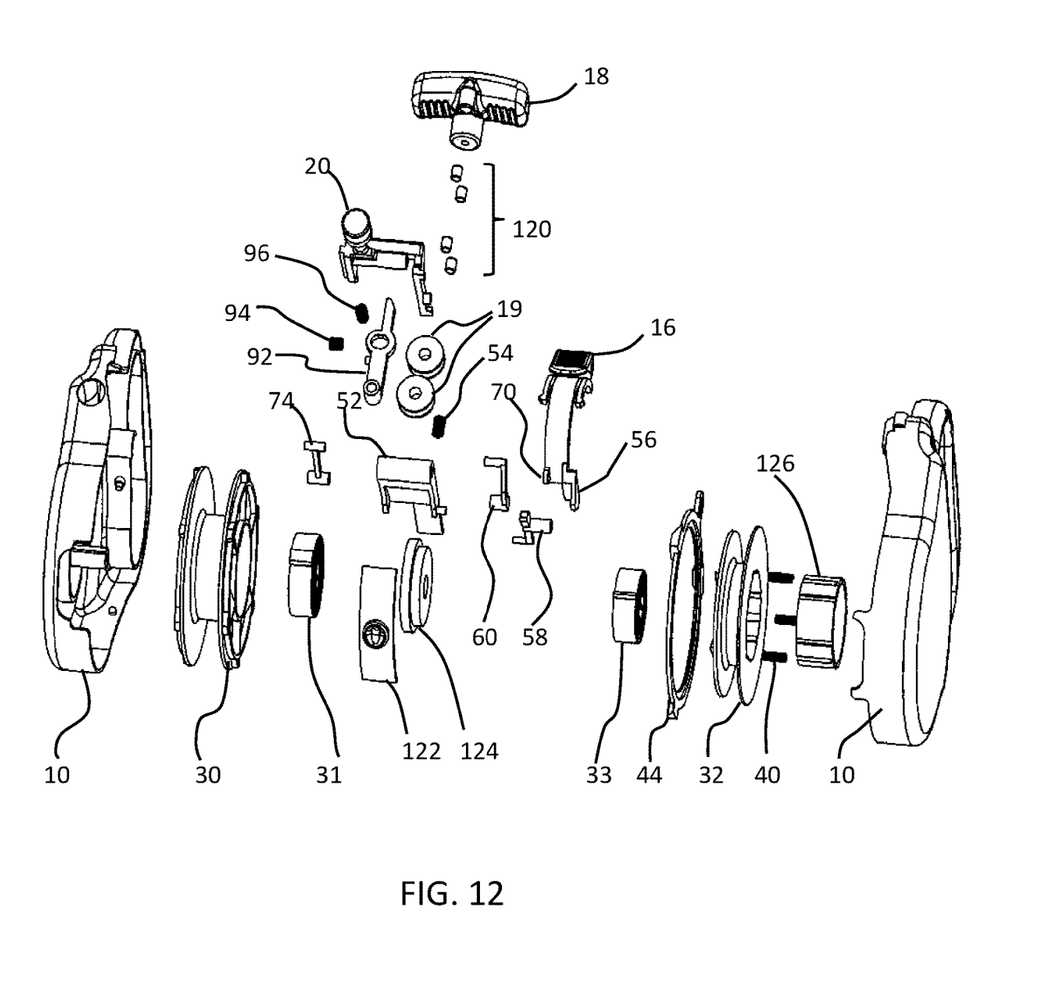
FIG. 12 is an exploded view of the components of the device.

An exploded view of all of the components of the device is shown in FIG. 12.

FIG. 12 shows some components not mentioned above. Item 120 comprises a set of magnets for holding the second handle in its cradle. Item 122 comprises a slider plate through which the dog leash passes. This allows some freedom in the position of the dog leash where it exits the housing. For example, when pulling the dog back, it is desirable if the second cord is in a straight line with the leash. This gives the user the impression that they are pulling the dog straight back, as if there were a fixed leash between them and the dog. The slider plate 122 enables this straight line connection to be formed.

Item 124 is a spool support, which sits between the inside edges of the two spools. Item 126 is a spool hub for the second spool. It is axially static but rotates with the spool. It is splined, and the spool rides axially over the outside, moved under the bias of the springs 40.

The example shown is only one detailed implementation of the desired functionality.

For example, the ratchet and pawl arrangement may be designed differently. There may be one pawl to control rotation in one direction and another to control rotation in the other. Thus, the brake function in the example above of pushing hard against a pawl may be replaced by using two pawls.

The automatic mode change when releasing the second handle is not essential. It may for example be necessary to put the main control knob 16 into a certain position (i.e. the position for the second mode) before using the second handle. This may simplify the design but may need the user to perform an additional action.

There may be a different coupling mechanism between the two spools and relative axial shifting is not essential. They may instead remain engaged all the time, with a controllable ratchet arrangement between them, so that they can be unlocked or locked in one direction only.

The pull cord for manually rewinding the leash gives as an intuitive design. The user can pull on the handle as if it were a conventional cord lead.

The two spools in the example above are mounted about the same axis of rotation. This is not essential, as there may be gearing between them either as cogs or pulleys. There is no need for the spools to be coaxial.

In the design above, the second spool 32 is moved over to engage with the first spool 30 and provide a face-to-face ratchet function once the second handle has been deployed. The rewind mechanism provided by the spring 31 needs to be strong enough still to function if the dog then comes towards the owner (rather than being pulled in by the owner using the second handle 18). If a very light rewind spring 31 is desired, which is not able to overcome the face to face ratcheting feature, an alternative design option is to arrange that as soon as the second handle 18 is returned to its cradle, the second spool 32 is also moved axially back to its first position to disengage it from the first spool 30.

There may be different designs for different size of dog. For example, the mechanical advantage offered by the second handle may be different for different dog sizes. For a lighter dog, fewer cord pulls may be needed. For example the cord 22 can be wound on a tight radius so that one pull corresponds to many spool rotations. For a heavy dog, the cord can be wound on a larger radius so that one pull corresponds to fewer spool rotations. A single device may instead be adjustable to set the desired balance between the pulling force applied to the dog and the speed with which the dog can be reeled in.

The leash is of particular interest for walking dogs, but it can be used for any animal.

The leash may be a rope or other cable with a generally circular cross section, but it may instead have a flat cross section in the form of a tape or strap. This applies both to the leash and to the emergency cord. The terms "cord" and "leash" should be understood as including all these options.

Other variations to the disclosed embodiments can be understood and effected by those skilled in the art in practicing the claimed invention, from a study of drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting in scope.

The invention claimed is:

1. A retractable leash device, comprising:
   a first handle for holding the device;
   a spool;
   a leash wound on the spool;
   a rewind mechanism for the leash;
   a second handle for manually retracting the leash, in the form of a retractable pull handle;
   a mechanical coupling between the second handle and the spool providing a second rewind mechanism for the leash; and
   wherein the device comprises a second spool and a cord wound on the second spool attached to the second handle.

2. A device as claimed in claim 1, wherein the rewind mechanism comprises a spring that urges the spool to rewind.

3. A device as claimed in claim 1, comprising a control mechanism (16) for the spool, which is operable in:
   a first mode in which the spool is free to rotate in both a wind and unwind direction;
   a second mode in which the spool is only able to rotate in the wind direction; and
   a third mode in which the spool is locked.

4. A device as claimed in claim 3, wherein engaging the second handle sets the control mechanism to the second mode.

5. A device as claimed in claim 3, wherein the control mechanism comprises a ratchet pawl for engaging with ratchet teeth of the spool.

6. A device as claimed in claim 1, wherein the pull handle is mounted in a cradle.

7. A device as claimed in claim 6, wherein removing the second handle from the cradle sets the control mechanism to the second mode.

8. A device as claimed in claim 1, wherein the first and second spools are spring biased towards each other, and a rotation lock is provided which allows rotation between the first and second spools in only one relative rotational direction.

9. A device as claimed in claim 8, comprising a retaining mechanism having a normal mode in which the first and second spools are kept separated when the second handle is not being used.

10. A device as claimed in claim 9, comprising a user control device for setting the retaining mechanism to the normal mode, wherein the control device is released when the second handle is engaged by the user, the retaining mechanism then switching to an emergency mode in which the first and second spools engage with each other.

11. A method of operating a retractable leash device comprising a first handle for holding the device, a spool and a leash wound on the spool,
    the method comprising:
    in normal use holding the leash device by the first handle using a first hand;
    in an emergency mode, operating a second handle, in the form of a retractable pull handle, using a second hand in order to manually retract the leash; and
    wherein operating the second handle comprises pulling the second handle a plurality of times, wherein the second handle is automatically rewound between pulls.

12. A method as claimed in claim 11, comprising, in normal use, selecting one of three operating modes:
    a first mode in which the spool is free to rotate in both a wind and unwind direction;
    a second mode in which the spool is only able to rotate in the wind direction; and
    a third mode in which the spool is locked.

13. A method as claimed in claim 12, wherein engaging the second handle automatically sets the second mode.

* * * * *